United States Patent
Staniforth et al.

(10) Patent No.: US 6,779,919 B1
(45) Date of Patent: Aug. 24, 2004

(54) PIPE PROBE

(75) Inventors: Peter A. Staniforth, Killingworth, CT (US); Scott D. Craig, Meriden, CT (US)

(73) Assignee: Cooper Instrument Corporation, Middlefield, CT (US)

( * ) Notice: Subject to any disclaimer, the term of this patent is extended or adjusted under 35 U.S.C. 154(b) by 0 days.

(21) Appl. No.: 10/606,073

(22) Filed: Jun. 25, 2003

(51) Int. Cl.⁷ .......................... G01K 1/14; G01K 1/08
(52) U.S. Cl. ............... 374/147; 374/208; 248/231.51
(58) Field of Search ........................... 374/208, 184, 374/147; 248/228.4, 230.4, 231.51

(56) References Cited

U.S. PATENT DOCUMENTS

| | | | |
|---|---|---|---|
| 4,492,948 A | | 1/1985 | Clayton et al. |
| 4,827,272 A | | 5/1989 | Davis |
| 5,016,843 A | * | 5/1991 | Ward ........................ 248/68.1 |
| 5,024,622 A | | 6/1991 | Ide |
| 5,108,055 A | * | 4/1992 | Kreinberg et al. ............ 248/71 |
| 5,343,624 A | * | 9/1994 | Symons ....................... 33/810 |
| 5,344,115 A | * | 9/1994 | Mayne et al. ........... 248/231.51 |
| 5,381,989 A | * | 1/1995 | Jackson .................. 248/231.51 |
| 5,454,641 A | * | 10/1995 | Parker et al. ................ 374/147 |
| 5,527,111 A | | 6/1996 | Lysen et al. |
| 6,334,707 B1 | * | 1/2002 | Ku .............................. 374/208 |
| 6,550,962 B1 | * | 4/2003 | Yang et al. .................. 374/147 |

* cited by examiner

*Primary Examiner*—Christopher W. Fulton
*Assistant Examiner*—Madeline Gonzalez
(74) *Attorney, Agent, or Firm*—Alix, Yale & Ristas, LLP

(57) ABSTRACT

A probe for measuring the surface temperature of a pipe includes an active clamp assembly and a passive clamp assembly, with the first end of the passive clamp assembly pivotally mounted to the first end of the active clamp assembly. The active clamp assembly has a first end portion forming a lower handle and a second end portion forming an upper jaw. A clamp temperature sensor assembly is carried in the upper jaw and an electronics module having a display panel is carried in the lower handle. The passive clamp assembly has a first end portion forming an upper handle and a second end portion forming a lower jaw. A spring biases the upper handle away from lower handle.

19 Claims, 4 Drawing Sheets

PIPE PROBE

BACKGROUND OF THE INVENTION

This invention relates generally to surface temperature measuring devices. More particularly, the present invention relates to surface temperature measuring devices that are placed in contact with the surface whose temperature is to be measured.

Conventional surface temperature measuring devices have often included a contact plate which is placed in contact with the object surface. The size of such contact plates was determined by a number of factors. On the one hand, the contact plate must not be so small that small, localized deposits on the object surface or the contact plate disproportionately affect the heat flow to the contact surface. Small contact plates are mechanically less robust and easily bend when the temperature measuring device is subjected to a relatively high bearing pressure. On the other hand, if the contact plate is formed to be relatively large, the measurements require more time, as a result of the greater thermal capacity of the plate. It is also a disadvantage of large contact plates that sufficiently large plane areas on the object are often not available. For measuring the surface temperature of cylindrical objects, such as pipes, a separate contact plate or measuring device is required for each diameter of pipe.

Hand-held devices having contact plates are especially unreliable and inaccurate, in part because the contact plate is not placed sufficiently flush on the object surface. Over the time period typically required to measure the temperature, the operator's hand typically cannot be held still or begins to tremble, as a result of continual body movements. This causes the contact plate to tilt relative to the object surface. Pressing the contact plate more firmly against the surface in an effort to provide better contact generally only serves to increase trembling of the operator's hand. The trembling movements of the hand are of many different kinds and of large dynamic range, such that they cannot be automatically countered in the signal processing portion of the device.

SUMMARY OF THE INVENTION

Briefly stated, the invention in a preferred form is a probe for measuring the surface temperature of a pipe which comprises an active clamp assembly and a passive clamp assembly, with the first end of the passive clamp assembly pivotally mounted to the first end of the active clamp assembly. The active clamp assembly includes a first end portion forming a lower handle and a second end portion forming an upper jaw. A clamp temperature sensor assembly is carried in the upper jaw and an electronics module is carried in the lower handle. The electronics module is in communication with the clamp temperature sensor assembly and has a display panel. The passive clamp assembly includes a first end portion forming an upper handle and a second end portion forming a lower jaw. A spring biases the upper handle away from lower handle. The surface temperature of the pipe is sensed by squeezing the upper and lower handles together opening a gap between the upper and lower jaws, inserting the pipe into the gap, and releasing the upper and lower handles. The spring urges the upper jaw toward the lower jaw to clamp the pipe therebetween and the clamp temperature sensor senses the surface temperature of the pipe.

The upper jaw has a clamping surface adapted for engaging the surface of the pipe. The clamp temperature sensor assembly comprises a sensor subassembly and a resilient underlayment composed of thermally insulating material. A first surface of the resilient underlayment is mounted within a recess of the clamping surface and the second surface is mounted to the sensor subassembly such that the sensor subassembly extends a predetermined distance from the clamping surface of the upper jaw. The sensor subassembly includes a temperature sensor mounted between inner and outer heat transfer elements, where each of the heat transfer elements are composed of a thin foil of highly conductive metal.

Preferably, the active clamp assembly also includes a spike temperature probe assembly including a rotary hinge rotatably mounted within the lower handle and a spike temperature probe having a pointed distal end portion and a proximal end portion mounted to the rotary hinge. The spike temperature probe is rotatable between an in-service position and a stowed position. The electronics module has a switch for connecting the spike temperature probe and disconnecting the clamp temperature sensor subassembly when the spike temperature probe is in the in-service position and connecting the clamp temperature sensor subassembly and disconnecting the spike temperature probe when the spike temperature probe is not in the in-service position.

A latch holds the spike temperature probe at the in-service position whenever the spike temperature probe is in service and within a recess of the lower handle when the spike temperature probe is not in service. The latch comprises first and second circumferentially spaced detents in the rim of the rotary hinge, a ball, and a spring. The spring biases the ball into the first detent when the spike temperature probe is positioned within the recess of the lower handle and biases the ball into the second detent when the spike temperature probe is positioned at the in-service position.

It is an object of the invention to provide a new and improved probe for measuring the surface temperature of a pipe.

It is also an object of the invention to provide a probe which is temporarily installed by hand to measure the surface temperature of a pipe, but which holds itself in place on the pipe surface.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
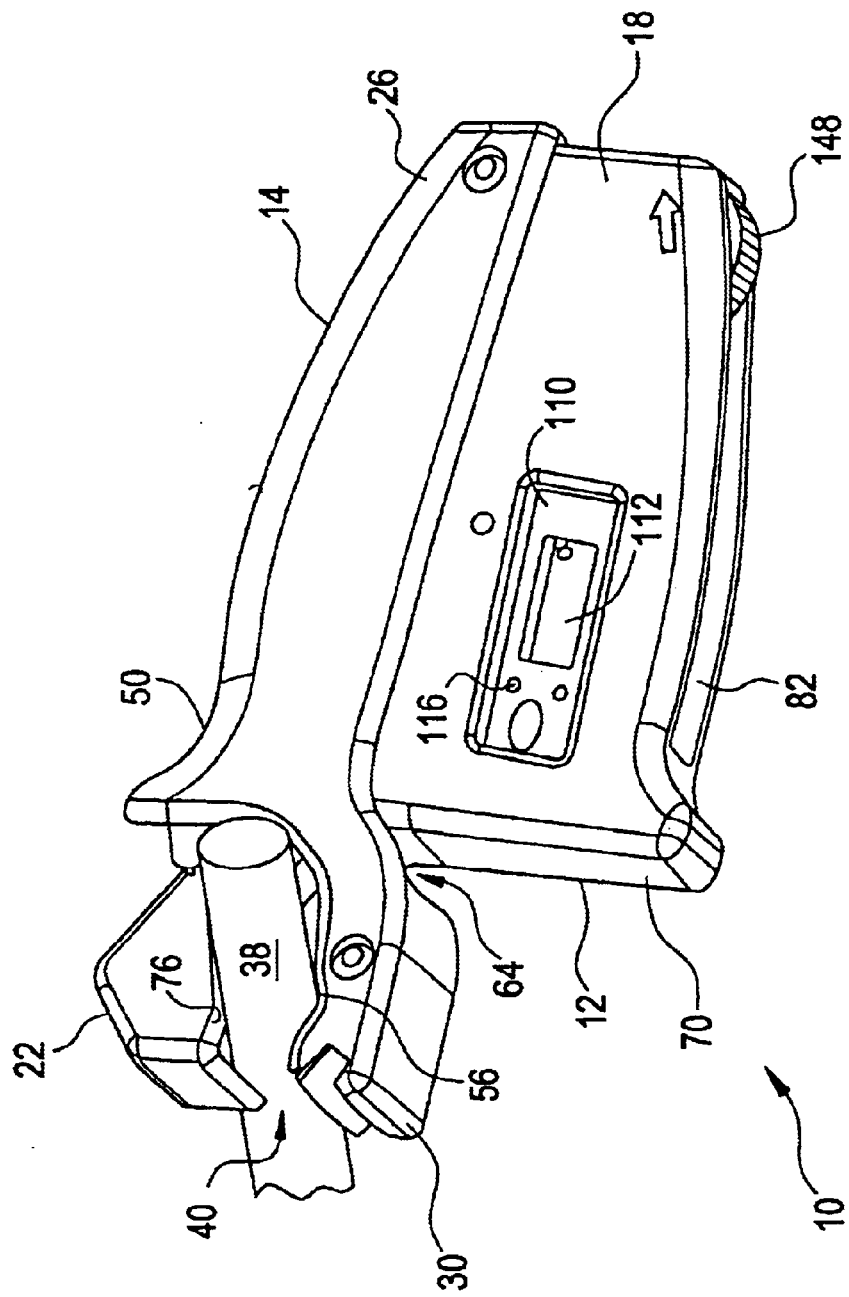
FIG. 1 is a perspective view of a pipe probe in accordance with the invention showing the pipe probe clamped to a pipe.

With reference to the drawings wherein like numerals represent like parts throughout the several figures, a pipe probe in accordance with the present invention is generally designated by the numeral 10. To facilitate description of the pipe probe 10, it is described as having a vertical orientation, as shown in FIG. 1. However, it should be appreciated that the pipe probe 10 may be used in any orientation.

Figure 2:
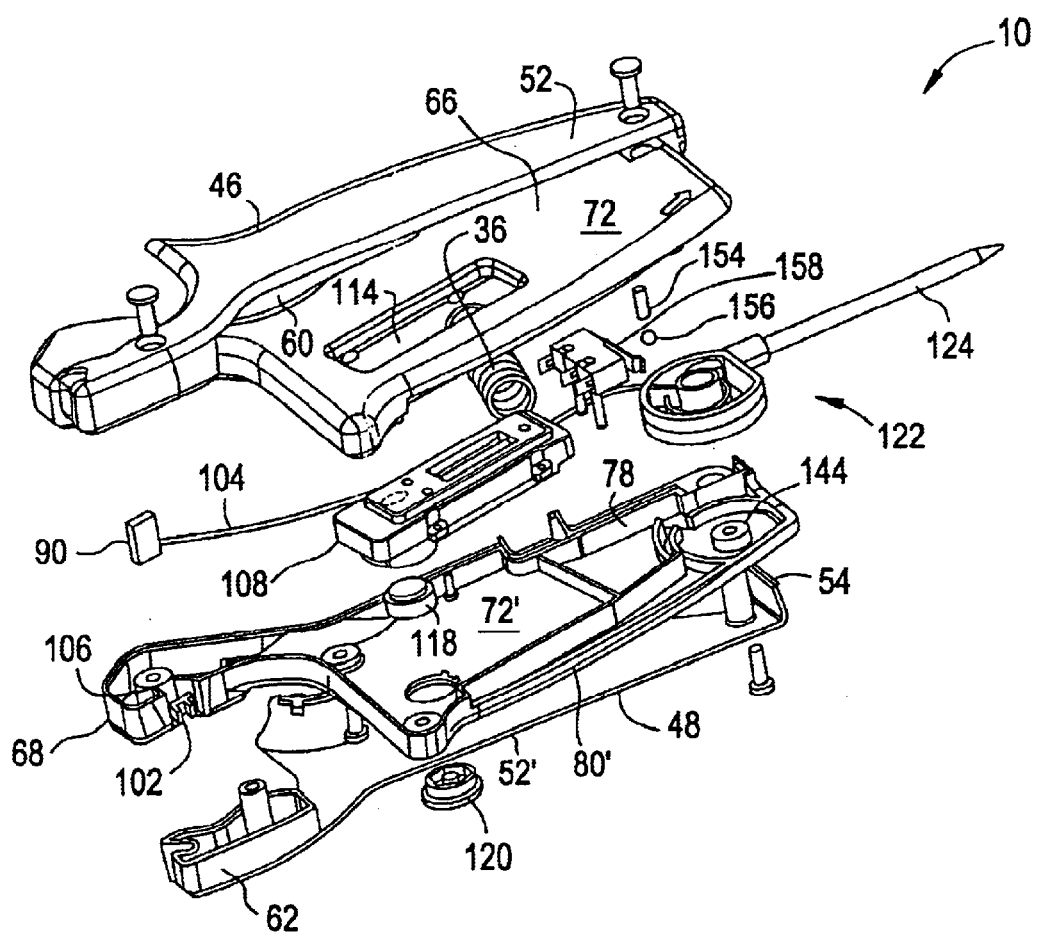
FIG. 2 is an exploded view of the pipe probe of FIG. 1.

With reference to FIGS. 1–2, the pipe probe 10 includes an active clamp assembly 12 and a passive clamp assembly 14. The active clamp assembly 12 has a first end portion forming a lower handle 18 of the pipe probe 10 and a second end portion forming an upper jaw 22 of the pipe probe 10. The passive clamp assembly 14 has a first end portion forming an upper handle 26 of the pipe probe 10 and a second end portion forming a lower jaw 30 of the pipe probe 10. The first end 32 of the active clamp assembly 12 is pivotally mounted to the first end 34 of the passive clamp assembly 14 and a spring 36 biases upper handle 26 away from lower handle 18. A pipe 38 may be clamped between the upper and lower jaws 22, 30 of the pipe probe 10 by squeezing the upper and lower handle 26, 18 together thereby opening a gap 40 between the second ends 42, 44 of the active and passive clamp assemblies 12, 14, inserting the pipe 38 through the gap 40, positioning the pipe 38 between the upper and lower jaws 22, 30, and releasing the upper and lower handles 26, 18 whereby the spring 36 urges the upper jaw 22 toward the lower jaw 30 to clamp the pipe 38 therebetween.

The passive clamp assembly 14 includes right and left shell halves 46, 48. When the shell halves 46, 48 are mounted together, they form a shell 50 having right and left sidewalls 52, 52' extending from the first end 34 to the second end 44, an end wall 54 at the first end 34, a clamping surface 56 of the lower jaw 30, a top surface 58 extending the length of the upper handle 26, and a bottom opening 60 extending the length of the upper handle 26. Preferably, the lower jaw 30 also has a bottom surface 62 to increase the mechanical strength and rigidity of the lower jaw 30. In an assembled pipe probe 10, the upper jaw 22 extends through a slot 64 between the clamping surface 56 of the lower jaw 30 and the upper handle 26.

The active clamp assembly 12 also includes right and left housing halves 66, 68. When the housing halves 66, 68 are mounted together, they form a housing 70 having right and left sidewalls 72, 72' extending from the first end 32 to the second end 42, an opening 74 at the first end 32, a clamping surface 76 of the upper jaw 22, and a top surface 78 extending from the first end 32 to the second end 42. The bottom of the lower handle 18 includes right and left lips 80, 80' and a recess 82 extending longitudinally from the opening 74 at the first end 32 to a position intermediate the first and second ends 32, 42. The recess 82 includes an upper surface 84 and an end surface 86 to increase the mechanical strength and rigidity of the lower handle 18 and to prevent entry of foreign matter into the housing 70. Preferably, the lower handle 18 also has an end wall 88 to increase the mechanical strength and rigidity of the lower handle 18 and to prevent entry of foreign matter into the housing 70.

Figure 6:
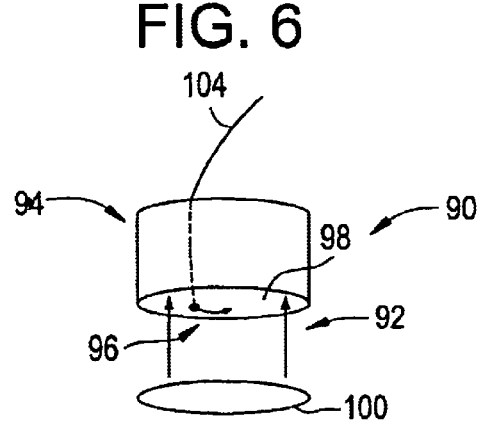
FIG. 6 is an enlarged schematic view of the thermistor assembly of FIG. 2.

A clamp temperature sensor assembly 90 is carried in the upper jaw 22 of the pipe probe 10. With reference to FIG. 6, the clamp temperature sensor assembly 90 preferably includes a sensor subassembly 92 which is mounted to a resilient underlayment 94. The sensor subassembly 92 comprises a thermistor 96 mounted between inner and outer heat transfer elements 98, 100. Preferably, the outer heat transfer element 100 is a thin, foil disk, plate or channel-shaped plate composed of highly conductive metal, preferably copper or aluminum, and the inner heat transfer element 98 is another thin, foil disk composed of highly conductive metal, preferably aluminum. The construction of the sensor subassembly 92 protects the thermistor sensor 96 from exposure to humidity, moisture and outside contaminants while providing for rapid response to changes in the sensed heat. Preferably, the resilient underlayment 94 is a pad of thermal insulation foam material to prevent transfer of heat from the inner heat transfer element 98 to the active clamp assembly 12.

The clamp temperature sensor assembly 90 is positioned in a recess 102 in the clamping surface 76 of the upper jaw 22, with the signal-carrying conductor 104 extending through an opening 106 in clamping surface 76. The top surface of the resilient underlayment 94 is mounted to the surface of the recess 102, with the sensor subassembly 92 positioned at a distance below the clamping surface 76 of the upper jaw 22. The resilient nature of the underlayment 94 allows relative movement between the sensor subassembly 92 and the upper jaw 22 of the pipe probe 10. Accordingly, the outer surface of the pipe 38 is contacted by the outer heat transfer element 100 before the clamping surface 76 of the upper jaw 22 and the resilient underlayment 94 is compressed as the clamping surface 76 of the upper jaw 22 moves into engagement with the surface of the pipe 38. This action ensures that there is sufficient contact between the outer heat transfer element 100 and the pipe 38 to provide for fast and accurate sensing of the pipe temperature. It should be appreciated that this action allows the sensor subassembly 92 to be cocked relative to the clamping surface 76 of the upper jaw 22 when the outer surface of the pipe 38 has an uneven configuration.

The signal-carrying conductor 104 of the clamp temperature sensor assembly 90 extends within the housing 70 from the opening 106 in clamping surface 76 to an electronics module 108 mounted within the housing 70 in the lower handle 18. The electronics module 108 includes a central processing unit (CPU) and a display panel 110 having an LCD display 112. The CPU converts the signal from the thermistor 96 to an output signal representative of the sensed temperature and transmits the output signal to the display panel 110. The display panel 110 is mounted in an opening 114 in the sidewall 72, 72' one of the housing halves 66, 68, allowing the LCD display 112 of the sensed temperature to be viewed at the pipe probe 10. Preferably, the display panel 110 also includes one or more control buttons 116 for operating the electronics module 108. A battery 118 mounted within the housing 70 provides power for operating the pipe probe 10. A battery cover 120 in the sidewall 72, 72' of one of the housing halves 66, 68 provides access to the battery 118, for removing depleted batteries and installing new batteries.

Figure 5:
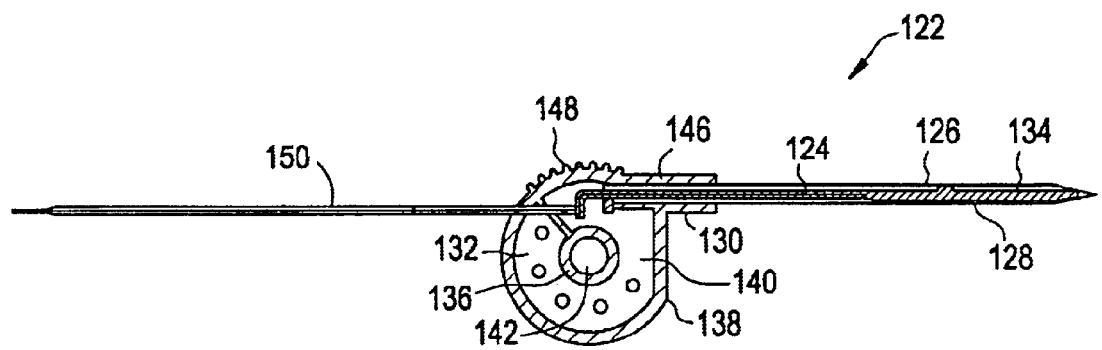
FIG. 5 is an enlarged side view of the hinged thermistor assembly of FIG. 2.

In a preferred embodiment, the pipe probe 10 includes a spike temperature probe assembly 122 in addition to the clamp temperature sensor assembly 90. With reference to FIG. 5, the spike temperature probe assembly 122 includes a spike temperature probe 124 comprising a tube 126 having a pointed distal end portion 128 and a proximal end portion 130 mounted in a rotary hinge 132. A thermistor 134 is mounted, preferably by potting, within the distal end portion 128 of the tube 126. The rotary hinge 132 includes an axial post receptacle 136, a coaxial rim 138, and a web 140 extending radially from the post receptacle 136 to the rim 138. The post receptacle 136 has a tubular shape, with an axial bore 142 which receives a post segment 144 which extends laterally inward from the inner surface of the sidewall 72, 72' of each housing half 66, 68. The outside diameter of the post segments 144 and the inside diameter of the bore 142 are selected such that the post receptacle 136 is free to rotate around the post segments 144. A tubular-shaped sensor receptacle 146 extends tangentially from rim 138, with the proximal end portion 130 of tube 126 being mounted within the sensor receptacle 146. The outer surface of rim 138 includes multiple ridges 148 proximate to the sensor receptacle 146, which extend laterally across the rim 138. A signal-carrying conductor 150 extends from the thermistor 134, to the electronics module 108, through the bore of tube 126, the opening of sensor receptacle 146, and an opening 152 in web 140. Preferably, signal-carrying conductor 150 is composed of an electrically conductive material having high flex strength.

Figure 3:
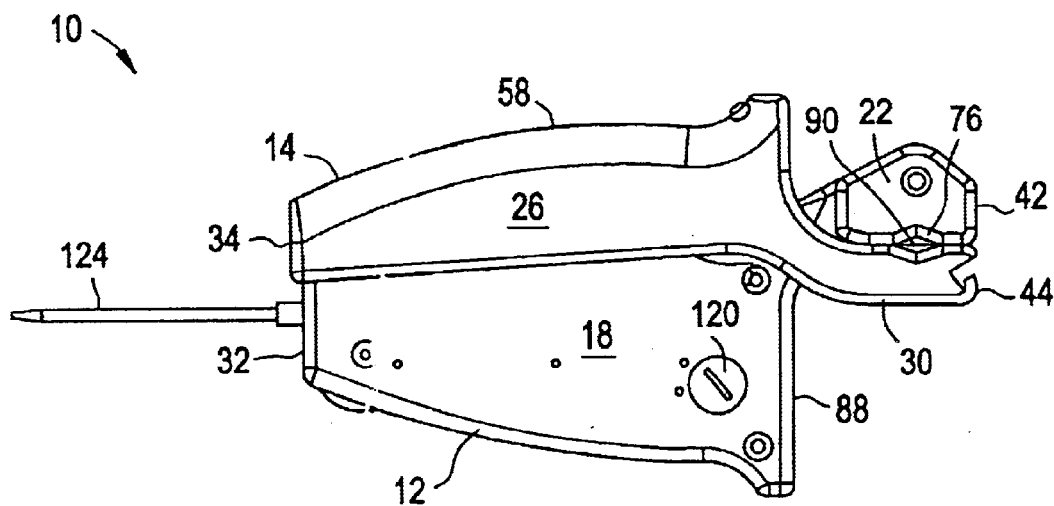
FIG. 3 is a side view of the pipe probe of FIG. 1.
Figure 4:
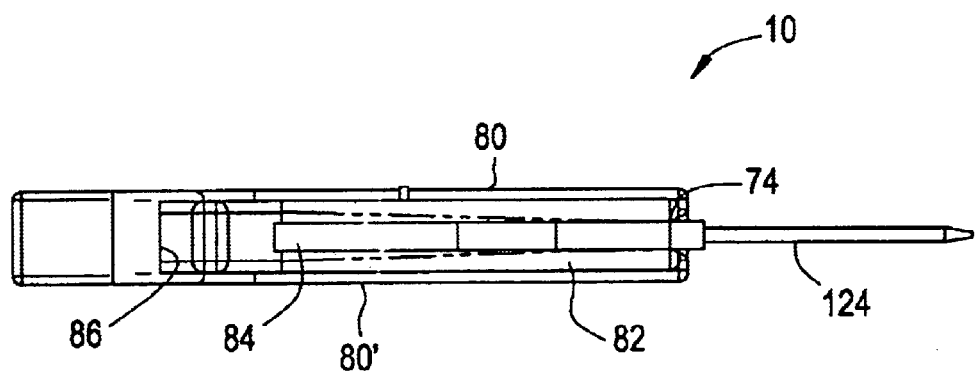
FIG. 4 is bottom view of the pipe probe of FIG. 1.

When the clamp temperature sensor 90 is to be used, the spike temperature probe 124 is stored in the recess 82 in the bottom of the lower handle 18 (FIG. 1). A spring 154 urges a ball 156 into a first detent in the rim 138 to hold the spike temperature probe 124 in the stowed position. To use the spike temperature probe 124, the operator rotates the probe 124 out of recess 82 by engaging the ridges 148 on rim 138 with one or more fingers and applying a force in the direction of the first end 32 which is sufficient to overcome the spring force of spring 154. When the spike temperature probe 124 is fully extended (FIGS. 3 and 4), spring 154 urges ball 156 into a second detent in the rim 138 to hold the spike temperature probe 124 in the fully extended position and the rim 138 engages a reed switch 158 which electrically connects signal-carrying conductor 150 (placing the spike temperature probe 124 in service) and electrically disconnects signal-carrying conductor 104 (placing the clamp temperature sensor 90 out of service). To return the clamp temperature sensor 90 to use, the operator applies a force on the spike temperature probe 124 in the direction of the second end 42, 44 which is sufficient to overcome the spring force of spring 154. When the spike temperature probe 124 leaves the fully extended position, rim 138 is disengaged from reed switch 158 which then electrically connects signal-carrying conductor 104 (placing the clamp temperature sensor 90 in service) and electrically disconnects signal-carrying conductor 150 (placing the spike temperature probe 124 out of service). When the spike temperature probe 124 is in recess 82, spring 154 urges ball 156 into the first detent in the rim to hold the spike temperature probe 124 in the stowed position.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A probe for measuring the surface temperature of a pipe, the probe comprising:
   an active clamp assembly extending from a first end to a second end and including
      a first end portion forming a lower handle,
      a second end portion forming an upper jaw,
      a clamp temperature sensor assembly carried in the upper jaw, and
      an electronics module carried in the lower handle, the electronics module being in communication with the clamp temperature sensor assembly and having a display panel;
   a passive clamp assembly extending from a first end to a second end, the first end of the passive clamp assembly being pivotally mounted to the first end of the active clamp assembly, and including
      a first end portion forming an upper handle, and
      a second end portion forming a lower jaw; and
   a spring biasing the upper handle away from lower handle;
   wherein the surface temperature of the pipe is sensed by squeezing the upper and lower handles together opening a gap between the upper and lower jaws, inserting the pipe into the gap, and releasing the upper and lower handles whereby the spring urges the upper jaw toward the lower jaw to clamp the pipe therebetween and the clamp temperature sensor senses the surface temperature of the pipe.

2. The probe of claim 1 wherein the clamp temperature sensor assembly comprises:
   a sensor subassembly and
   a resilient underlayment composed of thermally insulating material and having oppositely disposed first and second surfaces, the first surface being mounted to the upper jaw of the active clamp assembly and the second surface being mounted to the sensor subassembly.

3. The probe of claim 2 wherein the upper jaw has a clamping surface adapted for engaging the surface of the pipe, the clamping surface defining a recess, the clamp temperature assembly being mounted within the recess with the sensor subassembly extending a predetermined distance from the clamping surface of the upper jaw.

4. The probe of claim 2 wherein the sensor subassembly includes a temperature sensor mounted between inner and outer heat transfer elements, each of the heat transfer elements being composed of a thin foil of highly conductive metal.

5. The probe of claim 4 wherein the temperature sensor is a thermistor, the outer heat transfer element is composed of copper or aluminum, and the inner heat transfer element is composed of aluminum.

6. The probe of claim 4 wherein the clamp temperature sensor assembly also comprises a signal-carrying conductor for carrying a temperature signal from the temperature sensor to the electronics module.

7. The probe of claim 6 wherein the electronics module also has a central processing unit and the display panel has an LCD display, the central processing unit converting the temperature signal from the temperature sensor to an output signal representative of the sensed temperature and transmitting the output signal to the LCD display.

8. The probe of claim 7 wherein the display panel also has at least one control buttons for operating the electronics module.

9. The probe of claim 1 wherein the active clamp assembly further includes a battery mounted within the lower handle, the battery being in electrical communication with the electronics module.

10. The probe of claim 1 wherein the active clamp assembly further includes a spike temperature probe assembly comprising:
    a spike temperature probe having
       a tube with a pointed distal end portion and a proximal end portion and
       a temperature sensor mounted within the distal end portion of the tube and
    a signal-carrying conductor for carrying a temperature signal from the temperature sensor to the electronics module.

11. The probe of claim 10 wherein the electronics module also has a switch for connecting the spike temperature probe and disconnecting the clamp temperature sensor when the spike temperature probe is in service and connecting the clamp temperature sensor and disconnecting the spike temperature probe when the spike temperature probe is out of service.

12. The probe of claim 10 wherein the temperature sensor is a thermistor mounted within the tube by potting.

13. The probe of claim 10 wherein the spike temperature probe assembly further comprises a rotary hinge having:
    an axial post rotatably mounted to the lower handle;
    a coaxial rim;
    a web extending radially from the post receptacle to the rim; and
    a tubular-shaped sensor receptacle extending tangentially from the rim, the proximal end portion of the tube being mounted within the sensor receptacle.

14. The probe of claim 13 wherein the signal-carrying conductor is composed of an electrically conductive material having high flex strength.

15. The probe of claim 13 wherein lower handle defines a recess and the spike temperature probe assembly further comprises a latch for holding the spike temperature probe within the recess of the lower handle when the spike temperature probe is not in use or at an operating position when the spike temperature probe is in use.

16. The probe of claim 15 wherein the latch comprises:
    first and second circumferentially spaced detents in the rim of the rotary hinge;
    a ball; and
    a spring, the spring biasing the ball into the first detent when the spike temperature probe is positioned within the recess of the lower handle and biasing the ball into the second detent when the spike temperature probe is positioned at the operating position.

17. The probe of claim 15 wherein the electronics module also has a reed switch, the rim of the rotary hinge engaging the reed switch when the spike temperature probe is in the operating position, the reed switch electrically connecting the signal-carrying conductor of the spike temperature probe and electrically disconnecting the signal-carrying conductor of the clamp temperature sensor when engaged by the rim of the rotary hinge and electrically connecting the signal-carrying conductor of the clamp temperature sensor and electrically disconnecting the signal-carrying conductor of the spike temperature probe when not engaged by the rim of the rotary hinge.

18. A probe for measuring the surface temperature of a pipe, the probe comprising:
    an active clamp assembly extending from a first end to a second end and including
    a first end portion forming a lower handle,
    a second end portion forming an upper jaw,
    a clamp temperature sensor carried in the upper jaw,
    a spike temperature probe carried on the lower handle, the spike temperature probe being rotatable between an in-service position and a stowed position, and
    an electronics module carried in the lower handle, the electronics module having a switch for connecting the spike temperature probe and disconnecting the clamp temperature sensor when the spike temperature probe is in the in-service position and connecting the clamp temperature sensor and disconnecting the spike temperature probe when the spike temperature probe is not in the in-service position;
    a passive clamp assembly extending from a first end to a second end, the first end of the passive clamp assembly being pivotally mounted to the first end of the active clamp assembly, and including
    a first end portion forming an upper handle and
    a second end portion forming a lower jaw; and
    a spring biasing the upper handle away from lower handle.

19. A probe for measuring the surface temperature of a pipe, the probe comprising:
    an active clamp assembly extending from a first end to a second end and including
    a first end portion forming a lower handle,
    a second end portion forming an upper jaw,
    a clamp temperature sensor assembly having
        a sensor subassembly and
        a resilient underlayment composed of thermally insulating material and having oppositely disposed first and second surfaces, the first surface being mounted to the upper jaw of the active clamp assembly and the second surface being mounted to the sensor subassembly,
    a spike temperature probe assembly having
        a rotary hinge rotatably mounted within the lower handle and
        a spike temperature probe having a pointed distal end portion and a proximal end portion mounted to the rotary hinge, the spike temperature probe being rotatable between an in-service position and a stowed position, and
    an electronics module carried in the lower handle, the electronics module having a switch for connecting the spike temperature probe and disconnecting the clamp temperature sensor subassembly when the spike temperature probe is in the in-service position and connecting the clamp temperature sensor subassembly and disconnecting the spike temperature probe when the spike temperature probe is not in the in-service position;
    a passive clamp assembly extending from a first end to a second end, the first end of the passive clamp assembly being pivotally mounted to the first end of the active clamp assembly, and including
    a first end portion forming an upper handle and
    a second end portion forming a lower jaw; and
    a spring biasing the upper handle away from lower handle.

* * * * *